United States Patent Office 3,383,340
Patented May 14, 1968

3,383,340
REINFORCING FILLERS FOR RUBBER
Robert B. MacCallum, Dalton, and Robert M. Summers,
Pittsfield, Mass., assignors to General Electric Company, a corporation of New York
No Drawing. Filed May 12, 1965, Ser. No. 455,296
8 Claims. (Cl. 260—3)

ABSTRACT OF THE DISCLOSURE

An elastomeric rubber composition reinforced with a 2,6-substituted polyhenylene oxide.

This invention pertains to the use of a polyhenylene oxide as a reinforcing filler for a natural or synthetic rubber.

In order to render a natural or synthetic rubber readily adaptable for commercial utilization, it has been found necessary to add a reinforcing filler thereto. By selecting the proper filler, large improvements in physical properties such as tensile strength, abrasion resistance, tear resistance, etc., have been realized.

Carbon black is the most common filler used in the rubber industry. In addition to carbon black inorganic reinforcing fillers, such as zinc oxide and various silicas have been used for the reinforcement of light colored end products. Zinc oxide enables the resulting product to withstand extended exposure to high temperatures, and it also functions as an activator during the vulcanization process. The silicas have been used in those products in which high abrasion resistance is an essential requirement.

In terms of improvement in physical properties, carbon black is most effective. However, carbon black results in a black coloration in the end product. The blackening of the rubber by carbon black may not be avoided and this has led to the use of the inorganic reinforcing fillers noted above. However, these materials also present various disadvantages. Using inorganic fillers, it is possible to provide a rubber composition that is white or pigmented, but impossible to provide a colorless or water white material. In addition, the inorganic fillers improve physical properties but cause degradation of electrical and chemical properties. There have been various attempts to employ certain resins as reinforcing fillers for rubber, but it is believed that with the possible exception of hard styrene, no resin has heretofore been employed which even approximates carbon black or the other mineral fillers noted above.

I have now unexpectedly found that the polyphenylene oxides when used in conjunction with rubber are unique in that they provide a substantial reinforcing effect and hence cause increases in physical properties which approximate those of other conventional filler materials without degrading chemical or electrical properties. In addition to the reinforcing effect of the polyphenylene oxides, there are many other advantages to their use. One major advantage is that the polyphenylene oxides are water white. Hence, their use does not cause discoloration of the basic rubber composition. In addition, the polyphenylene oxides are easily pigmented and hence, a rubber composition with any desired color is easily formulated. In addition to this, the polyphenylene oxides have excellent electrical characteristics such as dielectric strength of between 400 to 500 volts/mil in thick sections over a broad range of cycles and temperatures. This approximates that of natural rubber and the common synthetic elastomers. In addition, the polyphenylene oxides have a power factor of approximately 0.06 percent.

This is superior to any other elastomer. Natural rubber has power factors varying between 0.31 to 1.25 percent. Inasmuch as the polyphenylene oxides have electrical properties either similar to or superior to those of many rubbers, the polyphenylene oxides improve the electrical properties of the rubber which they reinforce. In addition, rubber more readily wets the polyphenylene oxides allowing for a greater degree of dispersion of the polyphenylene oxide in the rubber.

Accordingly, an object of this invention is to provide a reinforced rubber composition comprising a natural or synthetic rubber and a polyphenylene oxide filler.

Briefly stated, the objects of this invention are achieved by dispersing a polyphenylene oxide in a natural or a synthetic rubber. The manner of dispersing the polyphenylene oxide in the rubber is not critical provided a uniform and homogeneous distribution is achieved. The quantity of polyphenylene oxide distributed in the rubber can vary between 10 and 150 phr. (parts per hundred) of the rubber.

By natural or synthetic rubber, we mean those rubbers obtained from rubber trees—i.e., natural latex, as well as synthetic materials such as, for example, butadiene-styrene copolymers, which are manufactured commercially under such names as GR–S 1000, GR–S 1500, GR–S 1600, GR–S 2000 and GR–S 2101 and the like, as well as rubber copolymers of butadiene and methylmethacrylate, 3,4-dichloroalphamethyl-styrene, methylisopropenyl ketone, vinyl pyridine and other related unsaturated monomers. Styrene-butadiene copolymers containing a high proportion of styrene, such as, for example, 40 to 80 percent, by weight, styrene, are particularly preferred materials to be used in preparing the compositions of this invention. Other synthetic rubbers include the neoprene rubbers, i.e., rubbers prepared from chloroprene, such as those known commercially as GR–n, neoprene type Gn, neoprene type E, neoprene type Fr and the like. Isobutylene rubbers, such as those known in the industry as Gr–1 rubbers, are also useful. Also included are the elastomeric copolymers of di-olefin and an acrylic nitrile. Butyl rubber, Thiokol, polysulfide rubber and polyurethane rubbers are also included within the scope of this definition.

The polyphenylene oxides are described and claimed in U.S. Patents, Nos. 3,306,874 and 3,306,875, of Allan S. Hay, the contents of which are incorporated herein by reference. The preferred polymers may be represented by the following general formula:

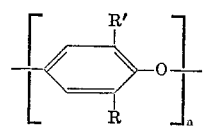

wherein R is a monovalent substituent selected from the group consisting of hydrogen, hydrocarbon radicals free of a tertiary α-carbon atom, halohydrocarbon radicals having at least two carbon atoms between the halogen atom and phenol nucleus and being free of a tertiary α-carbon atom, hydrocarbonoxy radicals free of aliphatic, tertiary α-carbon atoms, and halohydrocarbonoxy radicals having at least two carbon atoms between the halogen atom and phenol nucleus and being free of an aliphatic, tertiary α-carbon atom; R' is the same as R and may additionally be a halogen; $n$ may represent any whole integer greater than 100.

Typical examples of the monovalent hydrocarbon radicals that R and R' may be in the above formula are: alkyl, including cycloalkyl, e.g., methyl, ethyl, propyl, isopropyl, butyl, secondary butyl, tertiary butyl, isobutyl, cyclobutyl, amyl, cyclopentyl, hexyl, cyclohexyl, methylcyclohexyl, ethylcyclohexyl, octyl, decyl, octadecyl, etc.; alkenyl, including cycloalkenyl, e.g., vinyl, allyl, butenyl, cyclobutenyl, isopentenyl, cyclopentenyl, linolyl, etc.; alkenyl, e.g., propargyl, etc., aryl, including alkaryl, e.g., phenyl, tolyl, ethylphenyl, xylyl, naphthyl, methylnaphthyl, etc.; aralkyl, e.g., benzyl, phenylethyl, phenylpropyl, tolylethyl, etc. The monovalent halohydrocarbon radicals may be the same as the hydrocarbon radicals, as outlined above, except methyl and α-haloalkyl radicals, wherein one or more of the hydrogen atoms are replaced by halogen, to produce halohydrocarbon radicals having at least two carbon atoms between the halogen and the free valence, examples of which are: 2-chloroethyl, 2-bromoethyl, 2-fluoroethyl, 2,2-dichloroethyl, 2- and 3-bromopropyl, 2,2-difluoro-3-iodopropyl, 2-, 3-, and 4-bromobutyl, 2-, 3-, 4-, and 5-fluoroamyl, 2-chlorovinyl, 2- and 3-bromoallyl, 2- and 3-fluoropropargyl, mono-, di-, tri-, tetra-, and pentachlorophenyl, mono-, di-, tri-, and tetra-bromotolyl, chloroethylphenyl, ethylchlorophenyl, fluorophenylchloroethyl, bromotolylethyl, etc.

Typical examples of the monovalent hydrocarbonoxy radicals are: methoxy, ethoxy, propoxy, isopropoxy, butoxy, secondary butoxy, tertiary butoxy, amoxy, hexoxy, octoxy, decoxy, vinoxy, alloxy, butenoxy, propargoxy, phenyloxy, toloxy, ethylphenoxy, naphthoxy, methylnaphthoxy, benzoxy, phenylethoxy, phenylpropoxy, tolylethoxy, etc. The monovalent halohydrocarbonoxy radicals may be the same as the above oxyhydrocarbonoxy, except methoxy and α-haloalkoxy radicals, where one or more of the hydrogens are replaced by a halogen, i.e., fluorine, chlorine, bromine, or iodine, to produce halohydrocarbonoxy radicals having at least two carbon atoms between the halogen and the free valence, a few typical examples of which are: 2-chloroethoxy, 2-bromoethoxy, 2-fluoroethoxy, 2,2-dichloroethoxy, 2- and 3-bromopropoxy, 2,2-difluoro-3-chloropropoxy, 2-, 3-, and 4-iodobutoxy, 2-, 3-, 4-, and 5-fluoroamoxy, 2-chlorovinoxy, 2- and 3-bromoalloxy, 2- and 3-fluoropropargoxy, mono-, di-, tri-, and tetrabromotoloxy, chloroethylphenoxy, ethylchlorophenoxy, iodoxyloxy, chloronaphthoxy, bromobenzoxy, chlorophenylethoxy, phenylchloroethoxy, bromotolylethoxy, etc.

Typical examples of polyphenylene oxides which may be employed in the process of this invention are:

poly-(2,6-dimethyl-1,4-phenylene)-oxide,
poly-(2,6-diethyl-1,4-phenylene)-oxide,
poly-(2,6-dibutyl-1,4-phenylene)-oxide,
poly-(2,6-dilauryl-1,4-phenylene)-oxide,
poly-(2,6-dipropyl-1,4-phenylene)-oxide,
poly-(2,6-dimethoxy-1,4-phenylene)-oxide,
poly-(2,6-diethoxy-1,4-phenylene)-oxide,
poly-(2-methoxy-6-diethoxy-1,4-phenylene)oxide,
poly(2-methoxy-6-ethoxy-1,4-phenylene)-oxide,
poly-[2,6-di-(chlorophenoxy)-1,4-phenylene]-oxide,
poly-[2,6-di-(chloroethyl)-1,4-phenylene]-oxide,
poly-(2-methyl-6-isobutyl-1,4-phenylene)oxide,
poly-(2,6-ditolyl-1,4-phenylene)-oxide,
poly-[2,6-di-(chloropropyl)-1,4-phenylene]-oxide,
poly-(2,6-diphenyl-1,4-phenylene)-oxide, etc.

The term "polyphenylene oxide" as used throughout this application is intended to mean both the substituted and unsubstituted polyphenylene oxides.

The polyphenylene oxide filler is added to the rubber in any manner known to those skilled in the art. The important consideration in choosing the method is that the polyphenylene oxide be as homogeneously dispersed throughout the rubber as possible.

A typical procedure for adding polyphenylene oxide to rubber comprises four steps. The first is the step of compounding. This involves the selection of a rubber, the rubber chemicals used therewith—i.e., the vulcanization system, the anti-oxidants, the reinforcing filler and the processing aids, all of which must be carefully selected and proportioned with the object of making a product economically and with the requiste properties to perform its function in a satisfactory manner. Sulfur, an accelerator, and zinc oxide represent a vulcanization system which is commonly employed with all rubbers and suitable for the present invention. The next step in the operation comprises mixing the various ingredients together. This may be carried out either on a two-roll mill, an internal mixer, etc. The mixture is then subjected to a forming operation which might involve either extrusion into a desired shape, molding or calendering to sheet. Thereafter, the final step in the process consists of vulcanization. This is the process which converts the essentially plastic raw mixture to an elastic state. It is normally accomplished by applying heat for a specified time at a desired level. The most common methods of vulcanization are carried out in molds held closed by hydraulic presses and heated by contact with steam heated platens which are a part of the press, in open steam in an autoclave, under water maintained at a pressure higher than that of saturated steam at the desired temperature in air chambers in which hot air is circulated over the product, or by various combinations of these. The time and temperature required for the vulcanization of a particular product may be varied over a wide range by proper selection of the vulcanizing system. The rate of vulcanization increases exponentially with an increase in temperature, and hence the tendency is to vulcanize at the highest temperature possible. Further details in the processing of rubber compositions can be found in "The McGraw-Hill Encyclopedia of Science and Technology," volume II, McGraw-Hill Book Company, Inc., New York, 1960, pages 635 to 646.

The quantity of polyphenylene oxide that may be employed with the rubber may range between 10 to 150 parts per 100 parts of rubber. In general, it has been found that best results have been obtained when the polyphenylene oxide ranges between 30 to 60 parts per 100 parts of rubber and this constitutes a preferred embodiment of this invention. The particle size of the polyphenylene oxide is an important consideration as this contributes to the degree of homogeneity obtained. In general, it has been found that a particle size ranging between 0.1 and 200 microns is satisfactory; however, particles ranging between 1 and 10 microns have been found to produce better results than particles having a greater particle size and this range constitutes a preferred embodiment of this invention.

By adding a polyphenylene oxide reinforcing filler to rubber, it is possible to obtain increases in tensile strength approximating those obtainable with conventional reinforcing fillers. For example, when poly-(2,6-dimethyl-1,4-phenylene)-oxide is added to a styrene-butadiene rubber, tensile strengths of approximately 1200 p.s.i. are obtained. Using zinc oxide in approximately the same quantity, tensile strengths of only 900 p.s.i. are realized. A carbon black filler identified as Thermex (MT) resulted in a tensile strength of approximately 1400 p.s.i.

The following examples are illustrative of a process for incorporating a polyphenylene oxide reinforcing filler in rubber as well as the physical properties of the resulting rubber composition. The examples are merely for purpose of illustration and should not be considered as limiting.

Example 1

In this example, mixtures were prepared from a poly-(2,6-dimethyl-1,4-phenylene)-oxide having an intrinsic viscosity of 0.54 deciliter/gram (dl./g.) as measured in chloroform at 30° C. and a styrene-butadiene synthetic rubber having approximately 23.5 percent styrene and 76.5 percent butadiene, a Mooney viscosity of approximately 52, and a specific gravity of 0.94. Compositions were prepared having 0, 20, 30, 40, 50 and 60 parts polyphenylene oxide per 100 parts SBR. The polyphenylene oxide had a particle size of approximately 125 microns.

The basic formulation for the rubber was as follows:

| | Parts |
|---|---|
| Styrene-butadiene copolymer | 100.0 |
| Zinc oxide | 5.0 |
| Stearic acid | 2.0 |
| Sulfur | 2.0 |
| Benzothiazyl disulfide | 1.5 |
| Copper dimethyldithiocarbamate | 0.1 |
| Polymerized trimethyl dihydroquinoline | 1.0 |
| Poly-(2,6-dimethyl-1,4-phenylene)-oxide | 0–60 |

The polyphenylene oxide and styrene-butadiene rubber were mixed together and milled in close set water cooled twin rolls maintained at 40° C. Thereafter, the remainder of the ingredients were added and the composition milled to complete the dispersion of the ingredients. The uncured stock was remilled before vulcanization. Vulcanization was accomplished by injecting the milled composition into a mold measuring 8 x 8 x 0.07 inches and heating in an electrically heated press at 150° C. A cure time of 22 minutes was used. Tensile strength of the vulcanized samples was measured in an Instron strain gauge at a strain rate of 20 inches per minute. The following results were obtained.

TABLE I.—TENSILE STRENGTH OF SBR COMPOSITIONS CONTAINING POLY-(2,6-DIMETHYL-1,4-PHENYLENE)-OXIDE

| Poly-(2,6-dimethyl-1,4-phenylene)-oxide content (phr.): | Tensile strength (p.s.i.) |
|---|---|
| 0 | 297 |
| 20 | 677 |
| 30 | 839 |
| 40 | 983 |
| 50 | 1093 |
| 60 | 1196 |

Example 2

In this example, the procedure of Example 1 was repeated, but cure time was increased to 30 minutes. The following results were obtained.

TABLE II.—TENSILE STRENGTH OF SBR COMPOSITIONS CONTAINING POLY-(2,6-DIMETHYL-1,4-PHENYLENE)-OXIDE

| Poly-(2,6-dimethyl-1,4-phenylene) oxide content (phr.): | Tensile strength (p.s.i.) |
|---|---|
| 0 | 325 |
| 20 | 603 |
| 30 | 893 |
| 40 | 1001 |
| 50 | 1102 |
| 60 | 1193 |

Example 3

Examples 1 and 2 were repeated, but an oil-extended styrene-butadiene rubber, i.e., one having 35 phr. oil, was substituted for the elastomer of the previous examples. The styrene constituted 23½ percent of the copolymer and the butadiene constituted 76½ percent. The following results were obtained.

TABLE III.—TENSILE STRENGTH OF SBR COMPOSITIONS CONTAINING POLY-(2,6-DIMETHYL-1,4-PHENYLENE)-OXIDE

| Poly-(2,6-dimethyl-1,4-phenylene)-oxide content (phr.) | Tensile Strength (p.s.i.) | |
|---|---|---|
| | 20 min. Cure | 30 min. Cure |
| 0 | 199 | 202 |
| 20 | | 477 |
| 30 | 624 | 607 |
| 40 | 799 | 799 |
| 50 | 934 | 981 |
| 60 | 1,029 | 1,069 |

Example 4

In this example, the procedure of Example 1 was repeated; however, the polyphenylene oxide employed had a particle size ranging between 1 to 6 microns. Curing was accomplished by maintaining a temperature of 150° C. for 25 minutes. The following results were obtained.

TABLE IV.—TENSILE STRENGTH OF SBR COMPOSITIONS CONTAINING POLY-(2,6-DIMETHYL-1,4-PHENYLENE)-OXIDE

| Poly-(2,6-dimethyl-1,4-phenylene) oxide content (phr.): | Tensile strength (p.s.i.) |
|---|---|
| 0 | 297 |
| 30 | 1160 |
| 60 | 1530 |

Example 5

In this example, the procedure of Example 4 was repeated; however, the polyphenylene oxide employed was a poly-(2,6-dimethyl-1,4-phenylene)-oxide having an intrinsic viscosity of 0.75 as measured in chloroform at 30° C. The following results were obtained.

TABLE V.—TENSILE STRENGTH OF SBR COMPOSITIONS CONTAINING POLY-(2,6-DIMETHYL-1,4-PHENYLENE)-OXIDE

| Poly-(2,6-dimethyl-1,4-phenylene) oxide content (phr.): | Tensile strength (p.s.i.) |
|---|---|
| 0 | 297 |
| 30 | 1026 |
| 60 | 1474 |

Tensile strengths of SBR rubber composition containing conventional reinforcing fillers are set forth in the following table for purposes of comparison.

TABLE VI.—TENSILE STRENGTH OF SBR COMPOSITIONS CONTAINING REINFORCING FILLERS

| Filler | Content of Filler (phr.) | Tensile Strength (p.s.i.) |
|---|---|---|
| Zinc oxide | 78 | 910 |
| CaCO₃ (medium particle) | 74.2 | 330 |
| CaCO₃ (fine particle) | 74.2 | 1,380 |
| Thermax (MT) Carbon Black | 50.4 | 1,340 |
| Calcium Silicate | 57.4 | 1,420 |

From the above table and the previous examples, it is readily apparent that tensile strengths may be obtained using a polyphenylene oxide reinforcing filler which approximates those obtained using the more common reinforcing fillers.

It would of course be apparent to those skilled in the art that changes may be made in other particular embodiments of the invention described which are within the full intent and scope of the invention as defined by the appended claims. For example, materials other than vulcanizing agents, accelerators, etc. may be added to the basic rubber formulation. Such additional materials may include pigments used to color the rubber composition and other polymers to produce certain desired effects.

What we claim as new and desire to secure by Letters Patent of the United States is:

1. A composition of matter comprising an elastomer selected from the group consisting of natural and synthetic rubber and from 10 to 150 parts by weight per 100 parts of rubber of a particulate reinforcing filler having a particle size of from 0.1 to 200 microns, said filler being a polyphenylene oxide of the repeating structural formula:

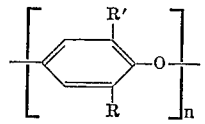

where R is a monovalent substituent selected from the group consisting of hydrogen, hydrocarbon radicals free of a tertiary alphacarbon atom, halohydrocarbon radicals having at least two carbon atoms between the halogen atom and phenol nucleus and being free of a tertiary alpha-carbon atom, hydrocarbonoxy radicals free of aliphatic, tertiary alpha-carbon atoms, and halohydrocarbonoxy radicals having at least two carbon atoms between the halogen atom and phenol nucleus and being free of an aliphatic, tertiary alpha-carbon atom; R' is a member of the group consisting of R and halogen; and $n$ is a whole integer greater than 100.

2. The composition of claim 1 wherein the polyphenylene oxide constitutes from 20 to 60 parts by weight per 100 parts of rubber.

3. The composition of claim 1 wherein the polyphenylene oxide has a particle size of from 1 to 10 microns.

4. The composition of claim 1 wherein the polyphenylene oxide is poly-(2,6-dimethyl-1,4-phenylene)-oxide.

5. The composition of claim 1 wherein the rubber is a styrene-butadiene copolymer.

6. The composition of claim 1 wherein the rubber is natural rubber.

7. A composition of matter consisting essentially of styrene-butadiene copolymer and a poly-(2,6-dimethyl-1,4-phenylene)-oxide reinforcing filler, said reinforcing filler constituting from 20 to 60 parts by weight per 100 parts of styrene-butadiene rubber and having a particle size of from 1 to 6 microns.

8. The composition of claim 7, wherein the styrene-butadiene rubber is an oil extended elastomer.

References Cited

UNITED STATES PATENTS

| | | | |
|---|---|---|---|
| 3,306,874 | 2/1967 | Hay | 260—47 |
| 3,306,875 | 2/1967 | Hay | 260—47 |
| 3,309,340 | 3/1967 | Borman | 260—47 |

ALLAN LIEBERMAN, *Primary Examiner.*